United States Patent [19]
Nissborg et al.

[11] Patent Number: 6,054,715
[45] Date of Patent: Apr. 25, 2000

[54] RADIATION SENSOR DETERMINING THE DIRECTION OF INCIDENCE

[75] Inventors: Kurt Nissborg, Skänninge; Gunnar Mannerskog, Linköping, both of Sweden

[73] Assignee: Simrad Optronics ASA, Oslo, Norway

[21] Appl. No.: 08/952,120

[22] PCT Filed: May 8, 1996

[86] PCT No.: PCT/SE96/00599

§ 371 Date: Nov. 7, 1997

§ 102(e) Date: Nov. 7, 1997

[87] PCT Pub. No.: WO96/35959

PCT Pub. Date: Nov. 14, 1996

[30] Foreign Application Priority Data

May 8, 1995 [SE] Sweden .................................. 9501700

[51] Int. Cl.[7] ................................ G01B 11/26; G01J 1/20
[52] U.S. Cl. .................... 250/551; 250/203.3; 250/206.2
[58] Field of Search ............................. 250/203.3, 206.1, 250/206.2, 208.4, 227.31, 551; 356/141.2, 141.5

[56] References Cited

U.S. PATENT DOCUMENTS

| | | | |
|---|---|---|---|
| 4,315,690 | 2/1982 | Trocellier et al. | 250/203.3 |
| 4,914,283 | 4/1990 | Brinckmann et al. | 250/208.4 |
| 5,103,088 | 4/1992 | Halldorsson et al. | 250/227.31 |

*Primary Examiner*—Stephone B. Allen
*Attorney, Agent, or Firm*—Jacobson, Price, Holman & Stern, PLLC

[57] ABSTRACT

A radiation sensor for determining the direction of incident radiation, which is designed to be able to measure via only one amplification path, within a dynamic range from the sensitivity limit of photodiodes included in the sensor to far above their saturation level. This is made possible by the sensor including a number of equally large resistors in a resistor chain between two tapping points for sensor signals, a number of photodiodes which are connected between the junction points between the resistors in the resistor chain and a bias source, the photodiodes being equidistantly spaced from each other along a line in a plane within which the angle of incidence is intended to be measured, and an optical element which causes incident radiation to illuminate different parts of the line of photodiodes, i.e., the detector row, in dependence on the direction of incidence of the radiation.

9 Claims, 5 Drawing Sheets

# RADIATION SENSOR DETERMINING THE DIRECTION OF INCIDENCE

FIELD OF THE INVENTION

The present invention relates to a radiation sensor for determining the direction of incident radiation. The starting point has especially been to provide a radiation sensor of the type concerned that can be used in military laser warning contexts. However, the radiation sensor can of course also be used in other contexts.

BACKGROUND OF THE INVENTION

One of the difficulties when constructing laser warning devices consists in the mastering of the great dynamic range of the incident light intensity. The range within which one could want the warner to function is within the irradiance extremes 10 mW/m² and 10 GW/m², i.e. the dynamic range amounts to 120 dB. If a range from 10 W/m² to 1 GW/m² is sufficient, the dynamic range will be 80 dB, which may be said to be a more reasonable value, but still a range that is technically difficult to measure. In addition to this difficulty, the illumination is in most cases pulsed and the pulses are very short (nanoseconds).

There are different ways of solving the problem. Signal processing that is based on the measuring of illumination-analog signals requires, for reasons of dynamics, a plurality of detectors and a plurality of signal paths. For each signal path, advanced electronics requiring great accuracy is necessary. If, on the other hand, one tries to build a signal receiver that functions digitally in the sense that illumination towards a detector produces a single type of response if the selected threshold value is exceeded, 360 detectors with signal processing are necessary if, for instance, an angular resolution of 1° is desired all around. The alternatives seem to be exacting electronics and a relatively large number of detectors or simpler signal processing, but then for a considerably larger number of detector signals.

If incident illumination can somehow be made to fall along a line, the illuminated position depending on the direction of incidence, it would be possible to use a position sensing detector (PSD) of commercial type. A one-dimensional PSD is an elongate photodetector of special design, in which the generated photocurrent is conducted in two separate paths. The position of the illumination is determined by measuring the currents delivered at the two ends of the PSD and calculations on the basis of these measured values. The relative size of these currents is determined by the difference in internal resistance between the illuminated point and the two current supply points of the PSD. The ratio of the difference to the sum of the two measured currents gives the position along the longitudinal axis of the detector. However, PSD detectors are not intended for so short pulses as those involved in laser warning contexts and, besides, their dynamic range is restricted, which means that commercially available detectors of this type cannot be used for the intended purpose.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
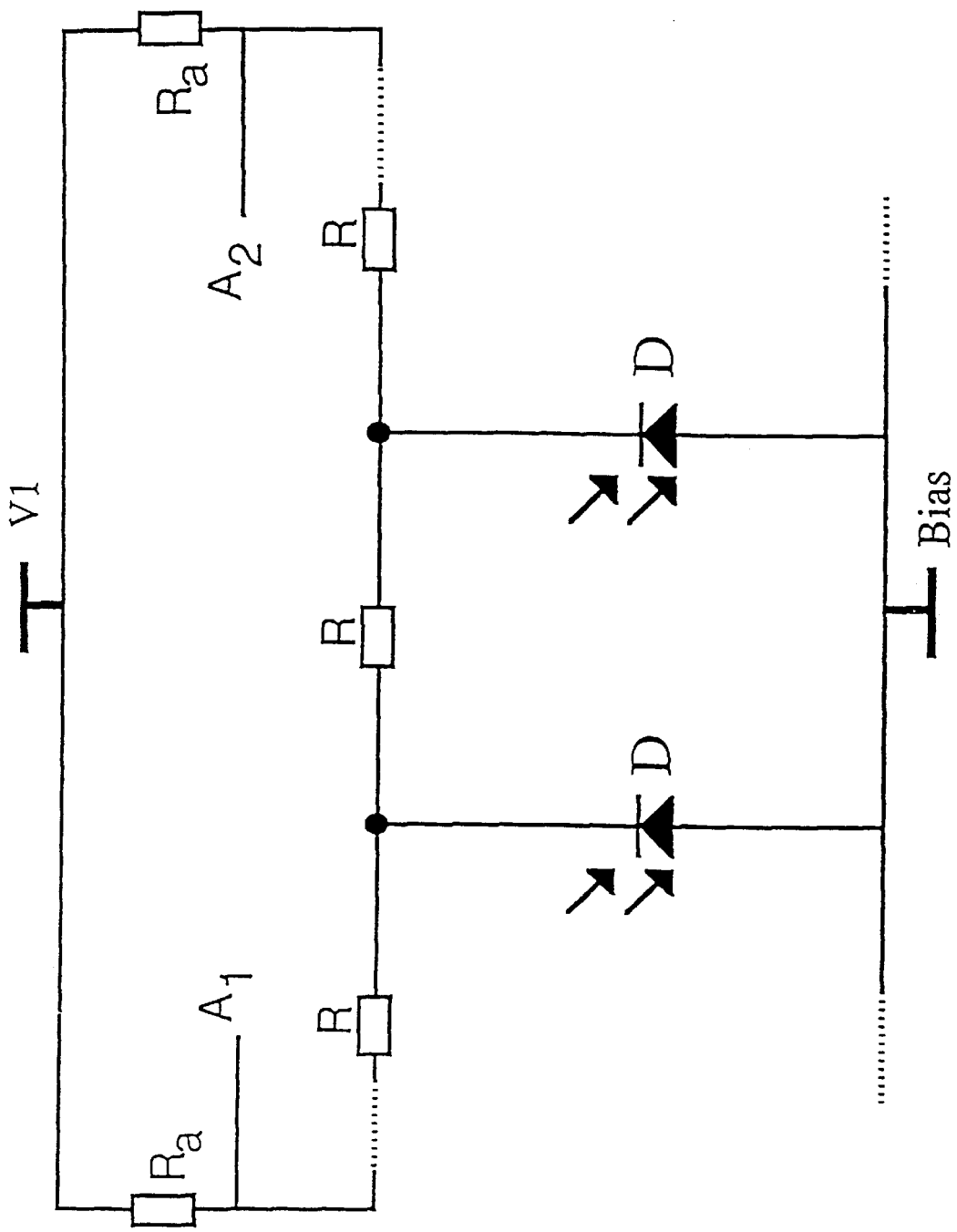
FIG. 1 is a basic sketch of a sensor according to the invention.

The basic idea in the invention is to create, by discrete elements, a PSD-like sensor construction, see FIG. 1, in which photodiodes are designated D and resistors R and $R_a$. With such a construction, there is no problem of satisfying the requirement for a quick response. A number of photodiodes D are connected between the junction points between a number of equally large resistors R in a chain of resistors and a bias source, which is selected such that the photodiodes are reverse-biased. The photodiodes are physically distributed at equal distances along a line in a plane within which the angle of incidence is intended to be measured. Just like in the case of the prior art PSD detector, incident radiation can be made to illuminate different parts of this row of detectors in dependence on the direction of incidence of the radiation. In both ends of the chain of resistors, signals can be taken out, whose relationship can be made to constitute a measure of where along the detector row of photodiodes the main focus of the radiation is located. It is possible to measure the currents at the ends of the chain of resistors. In a suitable circuit solution, as illustrated in the Figure, instead the voltage across the two resistors $R_a$ at the tapping points A1 and A2 are measured by means of a fix reference potential V1 and the resistors $R_a$. The ratio between these voltages determines the position of the point of illumination.

In this basic design, the sensor suffers from a number of shortcomings. The capacitance of the photodiodes D combined with the resistors R will function as a low-pass RC filter. This implies in turn that the stated bearing towards the source of illumination will depend on the pulse length of the source and, in an incorrect manner, by the position of the illumination along the line of photodiodes. This is disadvantageous. Moreover, the bias of the photodiodes decreases with the distance from the tapping points A1, A2, which is not desirable, since the bias should be as great as possible, thereby obtaining a quick response of the photodiodes to the incident radiation.

In order to obviate these drawbacks, the signal must be conducted merely from an active photodiode D via the chain of resistors out to the tapping points, without being conducted into non-active photodiodes. It is therefore necessary to introduce some sort of blocking device for the propagation of signals in undesired directions.

Figure 2:
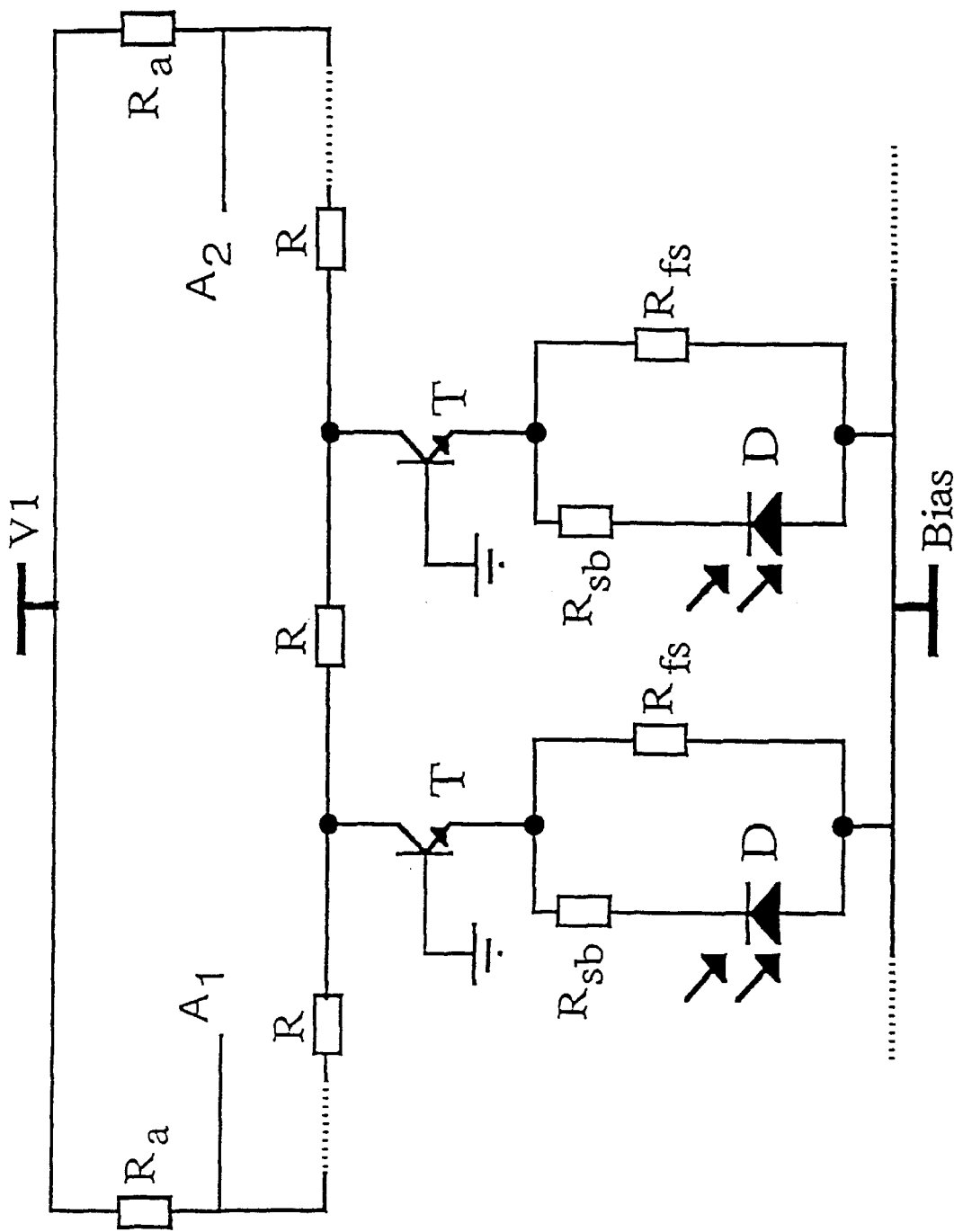
FIG. 2 illustrates an embodiment of a sensor according to the invention.

FIG. 2 indicates a solution to the problem. The solution is presented, implemented by means of NPN transistors, but it may, of course, also be implemented by means of PNP transistors. Necessary changes in the circuit diagram, such as the arrangement of components and bias, are obvious to those skilled in the art.

In comparison with the basic design according to FIG. 1, each photodiode is supplemented with a current-limiting resistor $r_{sb}$, a bias resistor $r_{fs}$, and a transistor T. The transistor, which is chosen to have as low capacitance as possible, operates according to the technique "common base", the base being on earth potential. The photodiode is arranged on the emitter of the transistor.

The transistors T prevent, owing to low capacitance, parts of the signal current from leaking out, on its way through the chain of resistors, through connections of non-illuminated photodiodes. The bias resistor $r_{fs}$ gives the transistor bias for a suitable working range.

By the current-limiting resistors $r_{sb}$, the maximum current through the transistor and thus out to the chain of resistors R is limited. The position-determining currents are measured at the resistors $R_a$ and can be given a suitable size so as not to accomplish saturation in any succeeding amplifiers even at a maximum level of illumination. On the other hand, the currents can be very long relative to the length of the light pulse, since basically the charge excited in the photodiode is proportional to the light energy that may vary by several ten decibels.

Several advantages are obtained by using a transistor in the connection. The most important are:

Insignificant effect of the pulse length on calculations of the bearing, since the blocking of undesired signal paths is considerable.

The possibility of limiting currents by means of the current-limiting resistor $r_{sb}$.

Easier signal processing when calculating the bearing, since the time factor is less critical.

The biases across the photodiodes do not affect each other.

By this inventive construction, it is thus possible to measure, by means of a single sensor in the form of a row of a desired number of photodiodes, within a dynamic range from the sensitivity limit of the photodiodes to far above their level of saturation.

As is evident from what has been said above, this design can only determine the direction of incidence in one plane, for instance, in the lateral direction, and for determining the vertical direction, it is necessary to add an identical device, whose optical properties are directed perpendicular to those of the first-mentioned.

It is in many cases advantageous if a warning device can calculate the intensity of incoming illumination. It is then possible to estimate whether the laser illumination concerns the platform carrying the warning device, or some other target. The inventive sensor construction has eliminated the possibility of measuring, in the entire dynamic range, an amplitude which in this respect is correct. In the range of saturated photodiodes, the intensity of illumination is instead reflected in an increased pulse length by the excited charge being let out gradually. However, this pulse length is easy to measure and calibrate, and therefore the invention also complies with this wish.

Figure 3:
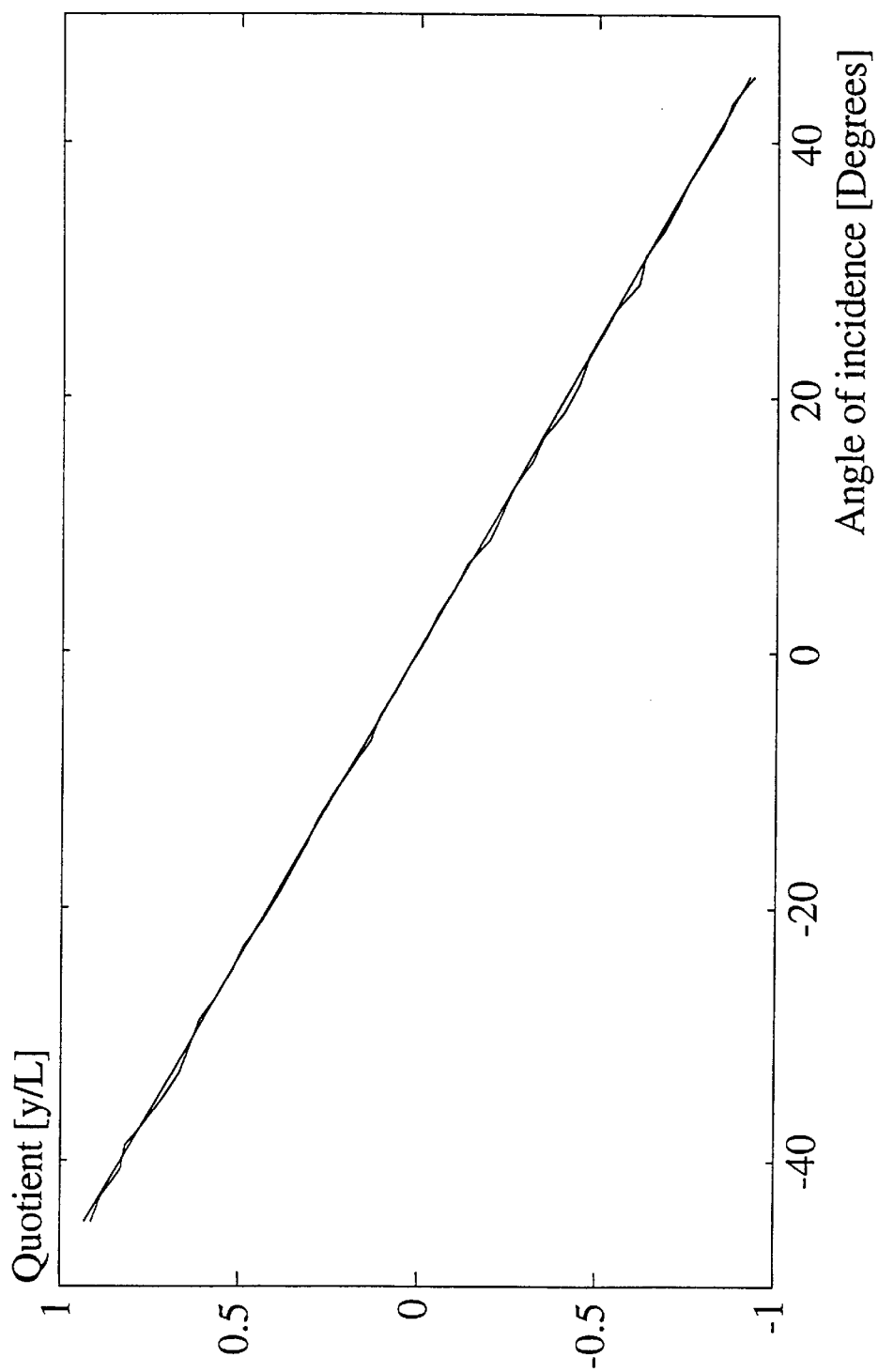
FIG. 3 is a diagram of measured values of different angles of incidence for a sensor according to the invention, a straight line being drawn, which represents the ideal outcome.
Figure 4:
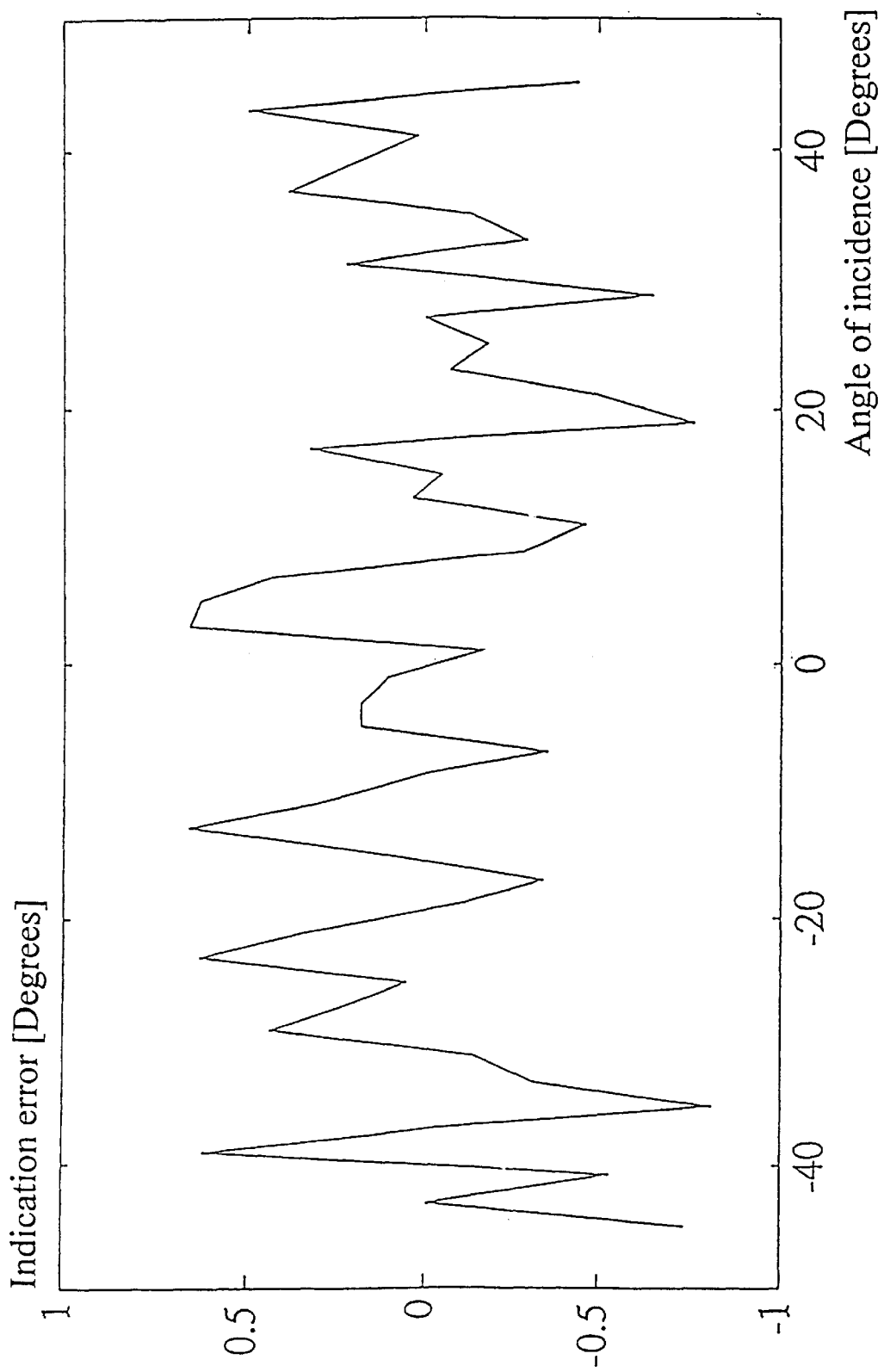
FIG. 4 is a diagram of measured angular errors at different angles of incidence in the above graph.

A sensor according to FIG. 2 has been illuminated and tested. The signal quotient calculated from the measured peak values is illustrated in FIG. 3, where a straight line, representing the ideal outcome, is also drawn. A further processing of the values to show the angular error relative to the theoretically correct value is shown in FIG. 4. Here, use has been made of peak value measurement for calculating the result.

Figure 5:
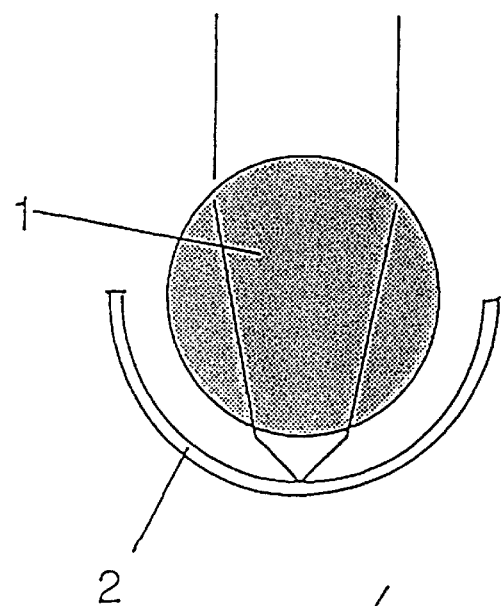
FIG. 5 illustrates a first embodiment of a sensor construction according to the invention having a lens element.
Figure 6:
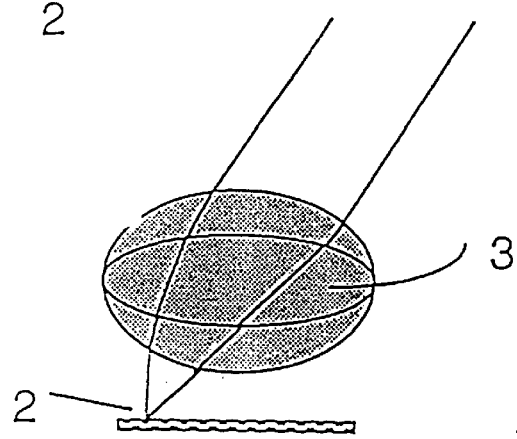
FIG. 6 illustrates a second embodiment of a sensor construction according to the invention having a lens element.

A last step according to the invention is to make the laser light fall on the detector row 2 in a position dependent on the direction of incidence. Several arrangements are possible. FIG. 5 illustrates an arrangement having a cylindrical lens 1 and a curved detector row of the above discussed type. FIG. 6 shows instead a one-dimensional fish-eye lens 3 together with a planar detector row according to the invention. These two alternatives give a certain optical amplification and are in many cases possible to use. A drawback of at least the alternative in FIG. 5 is, however, that central rays and marginal rays do not have the same focus, which especially in the case of high light intensities can result in a false response when calculating the angle of incidence.

Figure 7:
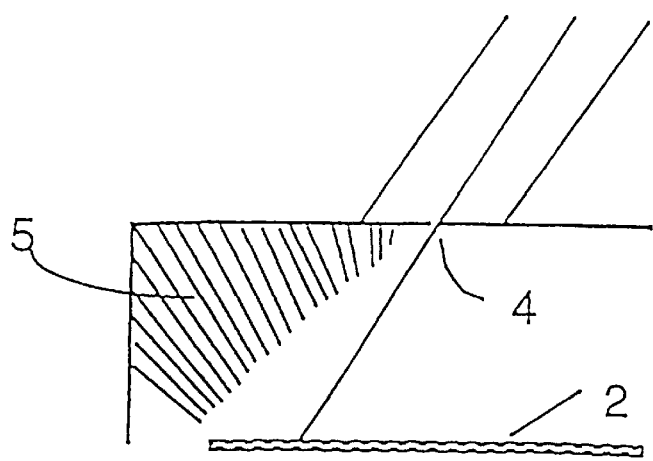
FIG. 7 illustrates a third embodiment of a sensor construction according to the invention having a slit.

FIG. 7 shows a simple arrangement having a slit 4 in front of a detector row 2 according to the invention. In this case, it may be convenient to provide the detector casing with internal baffles 5 for suppressing reflections in the detector casing.

In all the alternatives stated, the light-sensitive detector row 2 can be replaced by a fibre bundle which conducts the light to a detector row provided with electronics and placed in a shielding.

Further, the wavelength range within which the construction functions is in known manner restricted by the selected type of detector material. However, the range can readily be extended by parallel mounting of a plurality of detector rows made of materials that are sensitive to different wavelengths. For this technique, a construction having a slit as shown in FIG. 7 is best suited since no wavelength-dependent optical complications will then occur.

A sensor according to the invention can, within a great dynamic range—about 80 dB—in respect of light intensity, with great accuracy—±1°—and via only one signal path, determine the direction of incidence in one dimension for incident light-pulsed or continuous—for wavelengths and pulse lengths within the sensitivity range of the photodiodes.

We claim:

1. A radiation sensor determining the direction of incidence being designed to be able to measure within a dynamic range from the sensitivity limit of photodiodes included in the sensor to far above their saturation level by comprising a number of equally large resistors in a chain of resistors between two tapping points for sensor signals, a number of photodiodes connected between the junction points between the resistors in the resistor chain and a common bias source, one photodiode connected to each junction point, said bias source generating reverse voltage to the photodiodes, the photodiodes being equidistantly spaced from each other along a line in a plane within which the angle of incidence is intended to be measured, and an optical element which causes incident radiation to illuminate different parts of the line of photodiodes in dependence on the direction of incidence of the radiation.

2. The radiation sensor as claimed in claim 1, wherein a low-capacitive transistor is arranged in series with each photodiode and acts as a blocking means preventing signal current from leaking out from the resistor chain.

3. The radiation sensor as claimed in claim 2, wherein a current-limiting resistor is arranged in series with each photodiode and transistor and adapts the signal current to amplifiers following the resistor chain.

4. The radiation sensor as claimed in claim 1, wherein in the range of saturated signals, the signal intensity of the incident radiation is determined on the basis of the measured pulse length.

5. The radiation sensor as claimed in claim 1 further comprising an additional sensor, whose longitudinal axis is substantially perpendicular to that of the first sensor.

6. The radiation sensor as claimed in claim 1, wherein the optical element is a cylindrical lens.

7. The radiation sensor as claimed in claim 6, wherein the photodiodes are distributed along a circular arc concentric with the lens.

8. The radiation sensor as claimed in claim 1, wherein the optical element is a one-dimensional fish-eye lens.

9. The radiation sensor as claimed in claim 1, wherein the optical element is a sheet having a slit which is perpendicular to the plane in which the direction of incidence is intended to be measured.

* * * * *